United States Patent [19]

Hoshi et al.

[11] Patent Number: 4,953,199
[45] Date of Patent: Aug. 28, 1990

[54] INTERFACE APPARATUS FOR COMMUNICATION TERMINAL EQUIPMENT UNITS

[75] Inventors: Takashi Hoshi; Yoichi Sakai; Masaaki Tanabe, all of Yokosuka; Tatsuo Inoue; Takeshi Kamakura, both of Kawasaki; Teruaki Iijima; Hiroshi Nishinaga, both of Kawasaki; Tetsuro Yamashita, Kawasaki, all of Japan

[73] Assignees: Fuji Electric Co., Ltd., Kawasaki; Nippon Telegraph and Telephone Corporation, Tokyo, both of Japan

[21] Appl. No.: 197,193

[22] Filed: May 23, 1988

[51] Int. Cl.$^5$ .............................................. H04M 11/00
[52] U.S. Cl. ........................................ 379/93; 379/97; 379/100; 379/102
[58] Field of Search .................. 379/105, 93, 96, 97, 379/98, 100, 102, 104

[56] References Cited

U.S. PATENT DOCUMENTS

| | | | |
|---|---|---|---|
| 4,345,113 | 8/1982 | Shelley | 379/105 |
| 4,639,553 | 1/1987 | Kiglichi | 379/100 |
| 4,660,218 | 4/1987 | Hoshimoto | 379/93 |
| 4,677,660 | 6/1987 | Yoshida | 379/100 |
| 4,805,210 | 2/1989 | Griffith, Jr. | 379/184 |
| 4,821,312 | 4/1989 | Horton et al. | 379/102 |

FOREIGN PATENT DOCUMENTS

| | | | |
|---|---|---|---|
| 0194143 | 9/1986 | European Pat. Off. | 379/100 |
| 2855971 | 7/1980 | Fed. Rep. of Germany | 379/100 |
| 0210751 | 12/1983 | Japan | 379/93 |
| 0007802 | 12/1987 | PCT Int'l Appl. | 379/100 |
| 2166624 | 5/1986 | United Kingdom | 379/100 |

OTHER PUBLICATIONS

Finlay, Alex, "A New and Different Automatic Meter Reading", 2nd Int'l Conf. on Metering Apparatus 9/26–29/72.

*Primary Examiner*—Jin F. Ng
*Assistant Examiner*—Wing F. Chan
*Attorney, Agent, or Firm*—Spencer & Frank

[57] ABSTRACT

An interface apparatus connects one of a plurality of communication terminal equipment units to a single telephone line on the basis of a selection signal supplied via the telephone line. The telephone line is disconnected when there is no answer from the selected communication terminal equipment unit within a predetermined time period.

3 Claims, 4 Drawing Sheets

INTERFACE APPARATUS FOR COMMUNICATION TERMINAL EQUIPMENT UNITS

BACKGROUND OF THE INVENTION

1. Field of the Invention

The present invention relates to an interface apparatus for communication terminal equipment units, and more particularly to an interface apparatus which selectively connects one of a plurality of communication terminal equipment units with one telephone line.

2. Description of the Prior Art

Telephone sets have been used as communication terminal equipment units, along with facsimile apparatuses, image drawing communication terminal units, no-ringing communication terminal unit (hereinafter referred to as "telephone type terminal equipment") and data terminal equipment unit such as personal computers.

The circuit shown in FIG. 5 is a known connecting means for a connecting data terminal equipment (abbreviated to "DTE") unit with a telephone line. In FIG. 5, reference numeral 1 designates an exchange, 3C designates a telephone set, 5D designates a DTE unit, 7 designates a switch box, 22 designates a network control unit (NCU), 25 designates a modulator/demodulator equipment (MODEM) and l4 designates a telephone line.

As will be understandable from the drawing, the DTE unit 50 is connected with the telephone line by using the switch box 7. Here, the switch box 7 is connected with the telephone line l4, the telephone set 3C and the DTE unit 5D. By manual operation of the switch box 7, the line l4 is connected with the telephone set 3C or the DTE unit 5D.

This connection is, however, carried out manually, so that it is very difficult to promptly respond to the switch-over (exchange) between communication with the telephone set and with the DTE unit.

A control apparatus as shown in FIG. 6 has been proposed for solving this problem. The control apparatus comprises a switch box 7, an NCU 22, a MODEM 25 and a port T5 connected to a DTE unit 5D. The NCU 22 controls the switch box 7 to automatically connect the line l4 with the telephone set 3C or with the DTE unit 5D.

One control apparatus as shown in FIG. 6 must be installed for each telephone line. In other words, for a plurality of the DTE units the same number of telephone lines is required.

SUMMARY OF THE INVENTION

It is an object of the present invention to provide an interface apparatus which is capable of being connected to a plurality of communication terminal units of various kinds, and which can automatically and selectively connect one of the communication terminal units to a single telephone line.

It is another object of the present invention to provide an interface apparatus which eliminates unreasonable charges of fees against the other party.

It is still another object of the present invention to provide an interface apparatus capable of connecting a telephone set with a telephone line by priority over the other communication terminal units at the time of calling or incoming calls (that is, incoming information or data).

It is a further object of the present invention to provide an interface apparatus which permits the number of communication terminal equipment units used with it to be easily expanded.

In the first aspect of the present invention, an interface apparatus for communication terminal equipment units, comprises:

a plurality of first ports each to be connected to a communication terminal equipment unit;

a second port connected to one telephone line;

closing means for closing the telephone line through the second port on the basis off a signal indicating an incoming call supplied from the telephone line;

connecting means for connecting one of the plural communication terminal equipment units with the telephone line through a first port and the second port on the basis of a selection signal supplied from the telephone line through the second port after the closing of the telephone line by the closing means; and disconnecting means for disconnecting the telephone line if there is no answer from the corresponding communication terminal equipment unit within a predetermined time period from the time of connection of the communication terminal equipment unit with the telephone line.

Here, the disconnecting means may employ a predetermined time period suitable for each of the plural communication terminal equipment units.

In the second aspect of the present invention, an interface apparatus for communication terminal equipment units comprises:

a plurality of first ports each to be connected to one of a plurality of communication terminal equipment units including a telephone set;

a second port connected to a telephone line;

closing means for closing the telephone line on the basis of a signal indicative of incoming call supplied from the telephone line through the second port;

first connecting means for connecting one of the plural communication terminal equipment units with the telephone line through a first port and the second port in accordance with a selection signal fed from the telephone line through the second port within a predetermined time period from the closing time of the telephone line by the closing means; and second connecting means for connecting the telephone set with the telephone line through a first and the second port if the selection signal is not fed from the telephone line through the second port within the predetermined time period.

In the third aspect of the present invention, an interface apparatus for communication terminal equipment units comprises:

a plurality of first ports each connected to one of a plurality of communication terminal equipment units which include at least one telephone set and at least one data terminal equipment;

a second port connected to one telephone line;

first connecting means for connecting, on the basis of a call request from one of the plural communication terminal equipment units the one communication terminal equipment units with the telephone line through a first port and the second port; and second connecting means for connecting, after disconnecting the telephone line if there is a call request from the telephone set during communication with the data terminal equipment unit, the telephone set with the telephone line through a first port and the second port.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
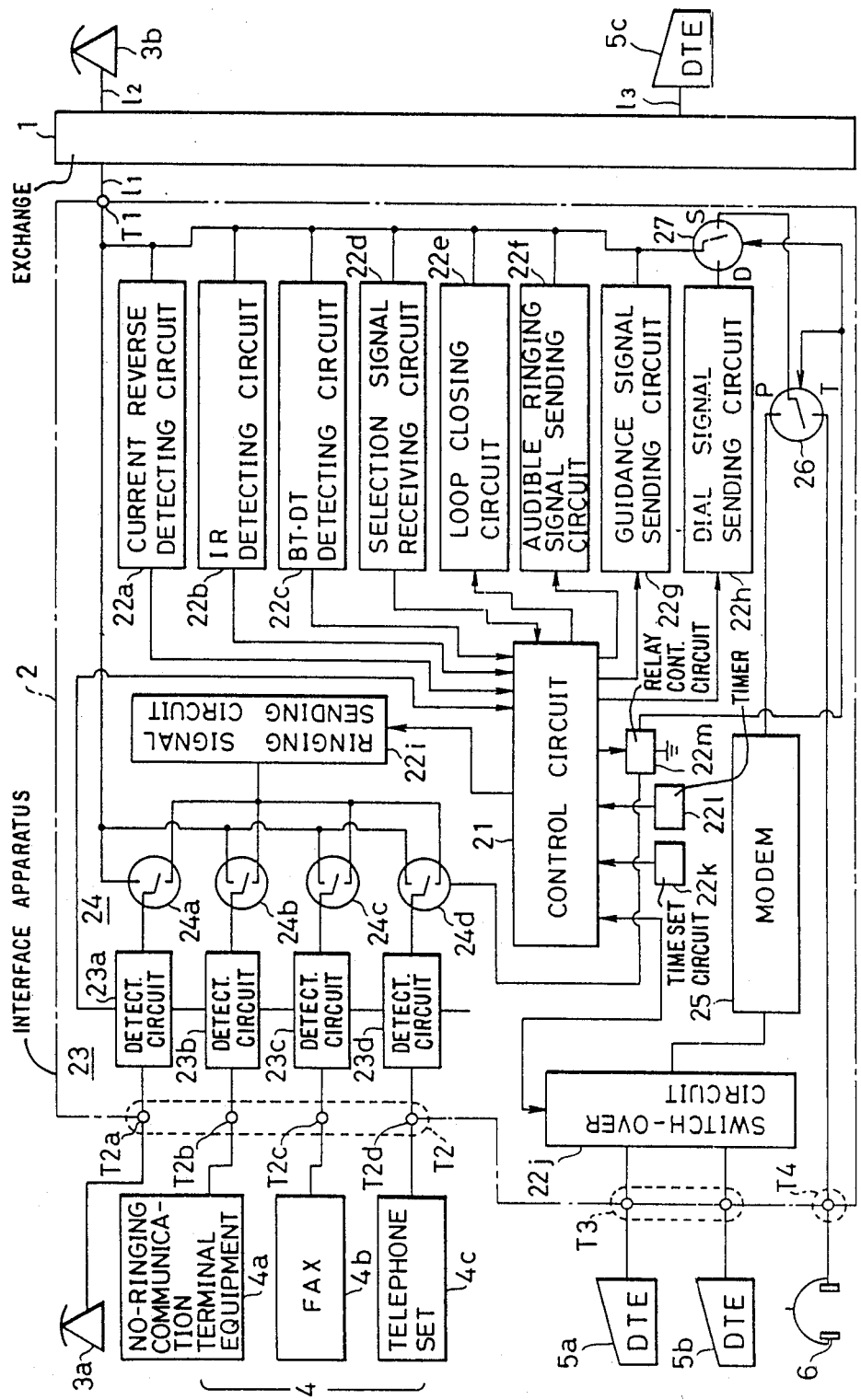
FIG. 1 shows a block diagram of an interface apparatus for communication terminal equipment units according to an embodiment of the present invention.

In FIG. 1, reference numeral 1 represents an exchange an reference numeral 2 designates an interface apparatus according to the present invention. Reference numerals 3a and 3b identify telephone sets. Reference numeral 4 collectively designates telephone type terminal equipment units. Reference numerals 5a, 5b and 5c represent data terminal equipment units, and reference numeral 6 identifies a headset. Reference numerals $l_1$, $l_2$ and $l_3$ represent telephone lines. Reference numerals T1 and T4 repesent ports, while reference numeral T2 identifies a port group having individual ports T2a, T2b, T2c and T2d. Reference numeral T3 identifies a port which comprises an RS 232C interface.

The interface apparatus 2 according to the present invention comprises the following components: A control circuit 21, including a CPU, a ROM and a RAM, controls the whole interface apparatus. A current reverse detecting circuit 22a detects a current reverse of the telephone line $l_1$ connected to the port T1. A ringing signal (IR) detecting circuit 22b detects an internal ringing signal (IR) of a frequency 16 Hz fed to the port T1. A busy tone (BT)·dial tone (DT) detecting circuit 22C detects a busy tone and a dial tone fed to the port T1. A selection signal receiving circuit 22d receives a selection signal fed to the port T1 for selecting the communication terminal equipment unit and supplies a signal specifying the corresponding communication terminal equipment unit to the control circuit 21. A loop closing circuit 22e can close the telephone line $l_1$ through the port T1. An audible ringing signal end sending circuit 22f supplies an audible ringing signal to the port T1. A guidance signal sending circuit 22g supplies a guidance signal to the port T1. A dial signal sending circuit 22h sends a dial signal to the port T1. A ringing signal sending circuit 22i sends a ringing signal to the telephone type terminal equipment units 4. Reference numeral 22j identifies a switch-over circuit, and reference numeral 25 designates a modulator/demodulator circuit (MODEM). The port T3 (which, as previously noted, comprises an RS 232C interface) matches two DTE (data terminal equipment) units 5a and 5b with the MODEM 25. The port T3 connects the DTE units 5a and 5b with the switch-over circuit 22j by using five lines SD, RTS, DTR, CTS and DSR (not shown). The switch-over circuit 22j is connected to the control circuit 21 and the MODEM 25 through the appropriate ones of the five lines.

A time-up length setting circuit 22k sets a time-up length (period) measured by a timer 22l. A relay control circuit 22m controls relays 24 (24a, 24b, 24c and 24d) and relays 26 and 27.

The four ports T2a, T2b, T2c and T2d of the port group T2 are each connected to a respective telephone type terminal equipment unit which uses two signal lines. The ports T2a, T2b T2c and T2d are connected to the telephone set 3A, a no-ringing communication terminal unit 4a, a facsimile (FAX) 4b ad a telephone set 4c, respectively. A relay circuit 24 comprises four relays 24a, 24b, 24c and 24d. An open/close detecting circuit 23 comprises four detecting circuits 23a, 23b, 23c and 23d. The detecting circuit 23a, 23b, 23c or 23d sends a signal in both directions between the port T2a, T2b, T2c or T2d and the relay 24a, 24b, 24c or 24d, respectively, and detects whether the two signal lines from the telephone type communication terminal equipment unit are closed or not in each of the ports. The detection result is supplied to the control circuit 21.

The relays 24a, 24b, 24c and 24d connect the ports T2a, T2b, T2c and T2d with the port T1 or to an output terminal of the ringing signal sending circuit 22i.

Now, various operations of the interface apparatus 2 constructed as stated above will be described. It is to be noted here that communication a terminal equipment unit on the other party side sends a ringing signal to the communication terminal equipment units connected to the interface apparatus 2 and sends a selection signal for selecting a communication terminal equipment unit connected to the interface apparatus 2 after the interface apparatus 2 temporarily answers to the call. The detailed explanation is omitted here.

(A) Answering a call from the other party's telephone set 3b

Upon receipt of a ringing signal from the other party's telephone set 3b via the exchange 1, a ring-back tone (RBT) or an audible ringing signal is sent from the exchange 1 to the calling party. Additionally, an internal ringing signal (IR) is sent to the telephone line $l_1$ and the polarity of the current in the line $l_1$ is reversed (the state where a first conductor of the telephone lien $l_1$ is at earth ground and a second conductor is at −48 V is changed to the state where the first conductor is at −48 V and the second conductor is at earth ground). The current reverse detecting circuit 22a in the interface apparatus 2 detects this reverse and supplies the detection signal to the control circuit 21. The control circuit 21 causes the loop closing circuit 22e to close the line $l_1$ (this is called "temporary answer"). After the temporary answer, if the selection signal receiving circuit 22d receives a selection signal for selecting the telephone set 3a of the called party, the control circuit 21 is supplied with a signal from the circuit 22d and controls the respective components as follows:

The ring-back tone (RBT) is sent to the calling party's telephone set 3b from the audible ringing signal sending circuit 22f through the line l₁, while the internal ringing signal (IR) is sent to the telephone set 3a in the interface apparatus 2 from the ringing signal sending circuit 22i through the relay circuit 24a, the open/close detecting circuit 23a and the port T2a, thereby ringing the telephone set 3a. After that, if the telephone set 3a is taken off-hook,, the off-hook condition is detected by the open/close detecting circuit 23a and the detection result is supplied to the control circuit 21. The control circuit 21 resets the ringing signal sending circuit 22i and the audible ringing signal sending circuit 22f to discontinue the internal ring signal IR and the ring-back tone RBT. The control circuit 21 also activates the relay control circuit 22m, which controls the relay 24a so as to permit voice communication by connecting the port T2a with the line l₁. It should be noted here that in the above operation the control circuit 21 similarly sends the ring-back tone RBT to the calling party, while ringing the telephone set 3a connected to the port T2a as described above, even if a selection signal is not fed to the selection signal receiving circuit 22d from the calling party within a predetermined time period after the temporary answer. Thus, voice communication is made possible through the interface apparatus 2 even if the function of the interface apparatus (a desired communication terminal unit may be selected by the selection signal) is unknown to the calling party.

(B) Answering a call from the other party's data terminal equipment unit 5c

The next operation to be described is where the DTE (data terminal equipment) unit 5a is specified by the selection signal supplied from the other party's DTE unit 5c after the temporary answer of the interface apparatus 2 to a call from DTE unit 5c. The operation up to the reception of the selection signal by the circuit 22d is the same as in the operation described above, and is omitted here.

The control circuit 21 calls the DTE unit 5a, in response to the receipt of the signal from the selection signal receiving circuit 22d, by sending a ringing signal which comprises character codes through the switchover circuit 22j to one of the five signal lines from the DTE 5a. Alternately, the control circuit may send the ringing signal to the DTE unit 5a by changing the voltage level of one of the five signal lines that has been allocated for receiving an incoming call indication. In addition to sending the ringing signal, the control circuit 21 sends the ring-back tone RBT to the calling party by driving the audible ringing signal sending circuit 22f. Subsequently, the control circuit 21 detects the answer from the DTE unit 5a through the switch-over circuit 22j, resets the audible ringing signal sending circuit 22f to stop the sending of the ring-back tone RBT, and causes the switch-over circuit 22j to connect to the MODEM 25 all of the signal lines from among the five signal lines from the DTE unit 5a that are necessary for communication with the calling party, thereby permitting communication with the calling party.

(C) Timer operation after a temporary answer

In the above described two answering operations, the line l₁ connected with the interface apparatus 2 is kept connected with the other party through the exchange 1, so that the other party is charged a fee even if there is no answer from the telephone type terminal equipment units or the data terminal equipment units connected to the interface apparatus 2. In order to eliminate this inconvenience, the control circuit 21 receives a signal signal specifying the desired telephone type terminal equipment unit or the data terminal equipment unit from the other party after the temporary answer by the interface apparatus 2, calls to the corresponding terminal equipment unit, and activates the timer 22l so as to determine whether the corresponding terminal equipment unit has answered within a predetermined period of time. The tim-up period (time) measured by the timer 22l is automatically determined dependent upon whether the terminal equipment unit to be called is of the telephone type, or not. When a data terminal equipment unit is called, the time-up periods (time) are different depending upon whether the terminal equipment unit is capable of immediately answering after detecting the call from the interface apparatus 2 or whether the terminal equipment unit is in off-line use or is otherwise occupied, so that it has to send the answer by stopping the program in operation and then starting a predetermined communication program. These various kinds of time-up period duration are set by the time-up setting circuit 22k. The control circuit 21 refers to the set value of the time-up period setting circuit 22k upon calling to the terminal equipment unit. If the corresponding terminal equipment unit answers within the set time-up period after calling, the control circuit 21 causes the aforementioned communication practicable state after resetting the timer 22l. On the other hand, if there is no answer from the corresponding terminal equipment unit within the set time-up period, the control circuit 21 resets the timer 22l and stops the calling to the corresponding terminal equipment units. The control circuit 21 also stops the operation of the audible ringing signal sending circuit 22f to discontinue the seinding of the ring-back tone RBT, causes the guidance sending circuit 22g to send the guidance signal, indicating that the terminal equipment unit is incapable of answering, to the other party. As the guidance signal, a voice and a tone signal are used for the telephone set and the data terminal equipment unit, respectively. After the guidance signal has been sent, the control circuit 21 resets the guidance sending circuit 22g and the loop closing circuit 22e for disconnecting the line l₁.

(D) First operation for making a call during communication

The operation of interface apparatus 2 will now be explained when there is a call request from a telephone type terminal equipment unit, including the telephone set 3a during communication with a data terminal equipment unit. The relays 24a, 24b, 24c and 24d connect the detection circuits 23a, 23b, 23c, and 23d with the ringing signal sending circuit 22i during the communication.

When a call is made from a telephone type communication terminal equipment unit (3a, 4a, 4b, or 4c), two signal lines of the corresponding telephone type communication terminal equipment unit are closed and one of the four detecting circuits 23a, 23b, 23c and 23d supplies a detection signal. In response to this detection signal, the control circuit 21 causes the loop closing circuit 22e to disconnect the line l₁ for returning to the initial state. The control circuit 21 then causes the relay control circuit 22m to control the corresponding relay (24a, 24b, 24c or 24d) so as to connect the corresponding telephone type terminal equipment unit with the line l₁. Thus communication with the corresponding unit becomes possible. According to this first operation, the telephone type terminal equipment units have priority for connection with the line $l_1$ even during communication with a data terminal equipment unit 5a or 5b.

(E) Second operation for making a call during communication

Even in the event that there is a call request from one of the telephone type communication terminal equipment units, including the telephone set, during communication with another of the telephone type communication terminal units, this call is executed without disrupting the communication route that has already been formed.

More specifically, for instance, if there is a call request from the facsimile (FAX) 4b (the two lines from the FAX 4b being closed) during communication with the telephone set 4c connected to the port T2d, the control circuit 21 activates the relay control circuit 22m to connect the port T2c (to which the FAX 4b is connected) with the line $l_1$ through the relay 24c and to connect the port T2d (which is connected to the telephone set 4c) with the ringing signal sending circuit 22i through the relay 24d. By this operation the two signal lines from the telephone set 4c are disconnected, while the facsimile 4b is connected with the line $l_1$. In other words, a switch-over from the port T2d to the port T2c is executed while keeping the communication route (the line $l_1$ is not disconnected). If a call request again originates from the telephone set 4c connected to the port T2d (i.e., the telephone set 4c is returned to the on hook state from the off-hook state state, and then taken off-hook again), the telephone set 4c is connected again with the line $l_1$ through a procedure similar to the foregoing. As described above, since the ports connected to the telephone type communication terminal equipment units are easily switched over to the line $l_1$, it is possible to switch over from the telephone set to another telephone type communication terminal equipment unit during communication, or to switch from another telephone type communication terminal equipment unit to the telephone set. This function is called the "port switch-over function".

Thus, a telephone type communication terminal equipment unit is connected with the line $l_1$ by priority over a non-telephone type communication terminal equipment unit for a call, while the telephone set is connected by priority for an incoming call.

(F) Calling from the data terminal equipment unit 5a

Figure 3:
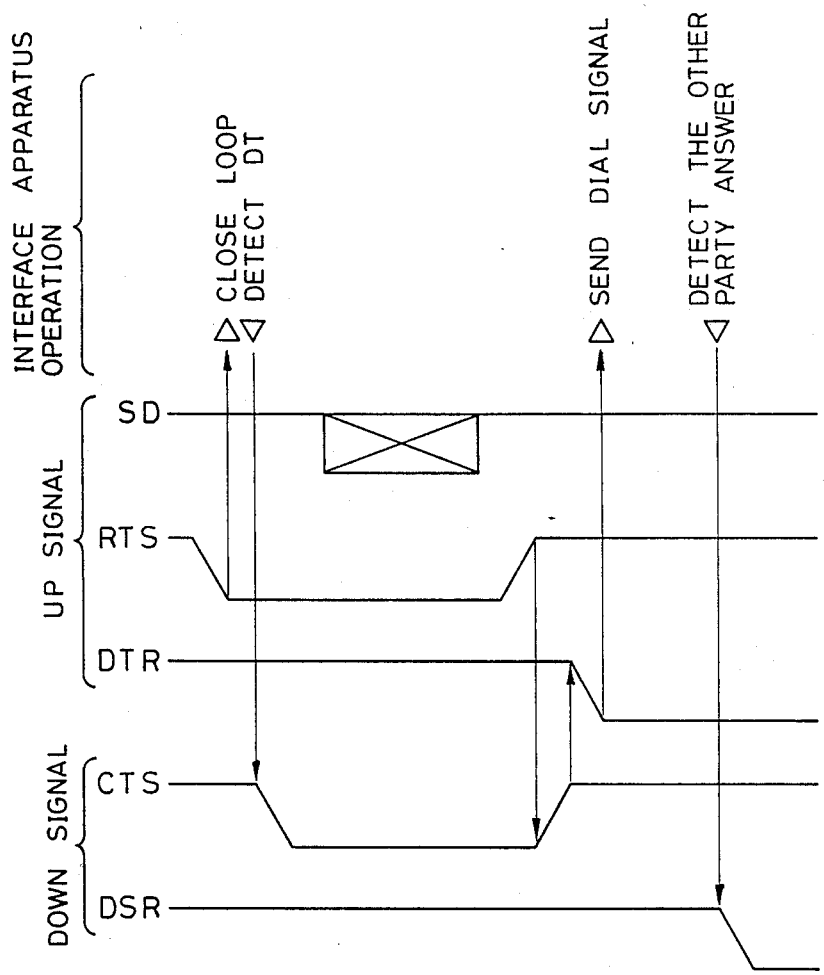
FIG. 3 shows a timing chart for controlling a data terminal equipment unit according to the present invention.

FIG. 3 is a timing chart for explaining a calling operation from the data terminal equipment unit 5a through the port T3. As the port T3, whatever interface is compatible with the MODEM 25 can is usable. Here, an RS-232C interface is used as the port T3 and five lines SD, RTS, DTR, CTS and DSR (not shown in FIG. 1) are employed. In FIG. 3, a signal flowing from the data terminal equipment unit 5a to the interface apparatus 2 is called an "up signal" and a signal flowing in the reverse direction is deemed a "down signal". High and low levels of the signal indicate the "off" and "on" states, respectively.

When the RTS line becomes "on" in response to a call request from the data terminal equipment unit 5a, the control circuit 21 causes the loop closing circuit 22e to close the line $l_1$. Thereafter, when the dial tone (DT) from the exchange 1 is detected by the BT·DT detecting circuit 22c, the control circuit 21 turns the CTS line "on" to inform the data terminal equipment unit 5a of the receipt of the dial tone DT. The data terminal equipment 5a, responsive to the "on" state of the CTS line sends the telephone number of the other party's data terminal equipment unit 5c to the control circuit 21 through the SD line, i.e., sends the dial signal and turns the RTS line "off" after completion of the sending. The control circuit 21 stores the corresponding dial signal in the RAM equipped therein. The control circuit 21 detects the completion of the sending of the the dial signal from the data terminal equipment 5a on the basis of the RTS line's "off" state and turns the CTS line "off". The data terminal equipment unit 5a confirms the receipt of the dial signal by the control circuit 21 on the basis of the CTS line's "off" state and turns and makes the DTR line "on" for the dial signal sending request. The control circuit 21 detects the DTR line "on" state and then causes the dial signal sending circuit 22h to send the telephone number of the other party's data terminal equipment unit 5c, received from the data terminal equipment unit 5a, to the line $l_1$. The exchange 1 sends the ring-back tone RBT and the internal ringing signal IR to the line $l_1$ and the other party's line $l_3$, respectively, and thereafter stops the sending of the ring-back tone RBT and internal ringing signal IR when the other party's data terminal equipment unit 5c answers. At this time, the polarity of the line $l_1$ is reversed. In response to detection of the polarity reverse by the current reverse detecting circuit 22a, the control circuit 21 turns the DSR line "on" and informs the data terminal equipment unit 5a of the answer by the other party's data terminal equipment unit 5c. Further, the control circuit 21 causes the switch-over circuit 22j to connect the MODEM 25 to all lines (among the signal lines of the port T3) to be used for the communication with the other party's data terminal equipment unit 5c. With the foregoing operation, it is possible to communicate between the data terminal equipment unit 5a and the other party's data terminal equipment unit 5c.

(G) Continuous calling

Figure 4:
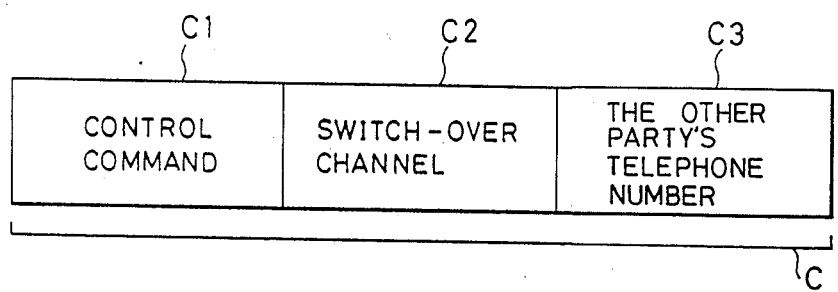
FIG. 4 shows a constructional drawing illustrating the format of a control signal for automatic calling in the apparatus of the present invention.
Figure 5:
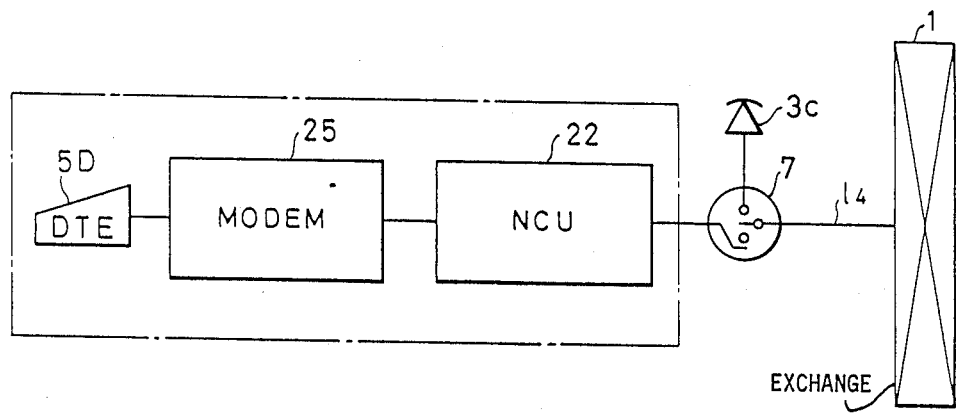
FIG. 5 shows a block diagram illustrating one example of a conventional manner for connecting a data terminal equipment unit to a telephone line.
Figure 6:
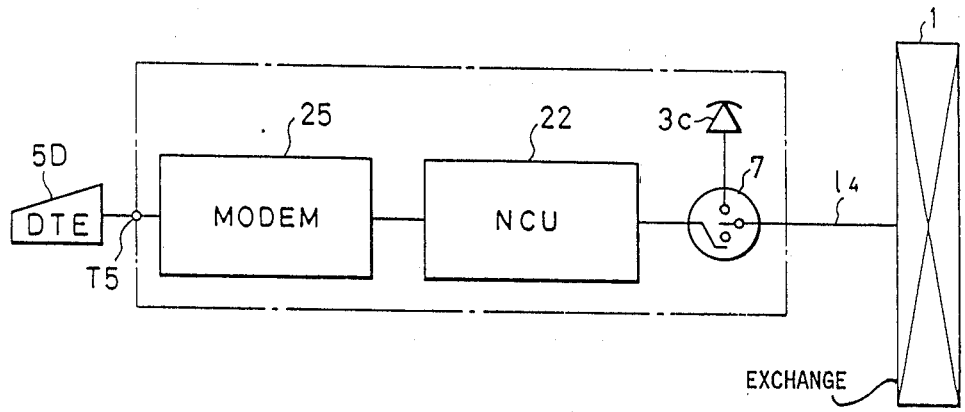
FIG. 6 shows a block diagram of another example of a conventional manner for connecting a data terminal equipment unit and a telephone line.

The present invention has, moreover, the function of continuous calling. This is the process of automatically and sequentially performing voice communication and data communication by supplying control information C as shown in FIG. 4 from the data terminal equipment unit 5a to the interface apparatus 2. In FIG. 4, C1 represents a control command, C2 designates a switch-over channel, and C3 represents the other party's telephone number.

More specifically, when the control command C1 is supplied from the data terminal equipment unit 5a to the control circuit 21 through the port T3 and the switch-over circuit 22j, the control circuit 21 closes the line $l_1$ using the loop closing circuit 22e. The control circuit 21 also detects the dial tone DT supplied from the exchange 1 through the line $l_1$, and transfers the contact of the relay 27 to the dial side D. The other party's telephone number C3 specified by the control command C1 is then sent to the exchange 1 by the dial signal sending circuit 22h. After completion of the sending of the other party's telephone number C3, the relay 27 is transferred to the voice communication side S and the relay 26 is transferred in accordance with the switch-over channel information C2. For instance, the relay 26 is transferred to the T side or the P side in accordance with whether the communication is to be voice communication or data communication. After the voice or the data communication terminates, in response to the control command C1, the line $l_1$ is disconnected by the loop closing circuit 22e to return to the initial state for receiving the next command. By providing the function described above it becomes possible to monitor the communication with the other party by means of the headset 6 even after automatic calling. Furthermore, since the next automatic calling procedure is prepared when the voice communication or the data communication is completed, the communication is automatically and successively carried out in accordance with the other party's list, prepared and displayed on a display of the data terminal equipment unit. This kind of call is, therefore, sometimes called a "list call".

Figure 2:
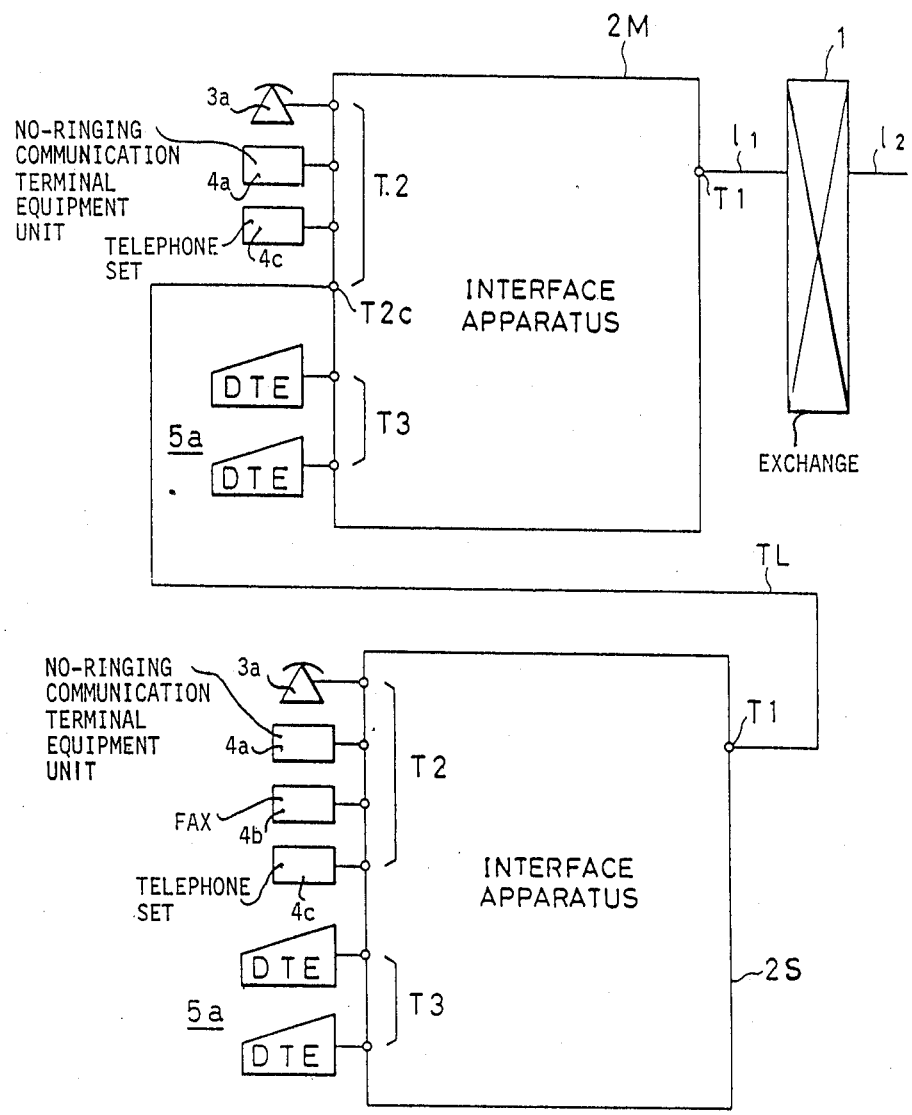
FIG. 2 shows an explanatory drawing illustrating two interface apparatuses according to the present invention connected in cascade to support an increased number of communication terminal equipment units.

According to the present invention, at least two interface apparatus may be cascade-connected to provide expansion. Namely, as shown in FIG. 2, the port T2c of the interface apparatus 2M on the master side is connected to the port T1 of the interface apparatus 2S on the slave side through the telephone line T1, thereby easily making it possible to increase the number of the terminal equipment units for one telephone line. The telephone line TL for expansion and the interface apparatus 2S on the slave side may be considered one telephone type communication terminal equipment unit on the master side. This relation holds even if another interface apparatus is connected to the port T2c of the interface apparatus 2C on the slave side, thereby achieving an increase in the number of the communication terminal equipment units without increasing the number of the telephone lines. The control programs of the control circuits 21 in the interface apparatus on the master and slave sides are almost the same and therefore common hardware is usable. This permits the number of the installed terminal equipment units to be easily increased in an economical manner. Moreover, the interface apparatus is commonly used for the master and the slave by selecting one of two control programs prepared for the control circuit 21 through the switch.

In this construction, for example when there is a call from a telephone set at the port T2a on the slave side, the call procedure is carried out by connecting the telephone set on the slave side with the line $l_1$ in accordance with the following steps:

The telephone set is taken off-hook, and the detecting circuit 23a on the slave side detects the off-hook condition. On the master side, the off-hook condition is detected through the telephone line TL for expansion, and the port T2c is then connected with the line $l_1$ on the master side.

For the incoming call, the interface apparatus 2M on the master side temporarily answers and waits for the selection signal from the calling party. The master interface apparatus 2M calls to the slave interface apparatus if the received selection signal designates the port T2c. The ringing signal sending circuit 22i of the master interface apparatus 2M operates at this time and then the slave interface apparatus 2S temporarily answers. After that, assuming that it has been arranged so so that the calling part sends the final selection signal after a predetermined timing, this signal is directly received by the slave interface apparatus 2S through the master interface apparatus 2M. The desired port at the slave interface apparatus 2S may be connected with the line $l_1$ by decoding this signal.

In the above description, although the interface apparatuses are cascade-connected to each other, it is apparent that the expansion may be achieved by connecting the telephone type terminal equipment units with the interface apparatus 2.

As was described above, the present invention makes it possible to automatically connect one of a plurality of communication terminal equipment units with a telephone line on the basis of a selection signal supplied via the telephone line, and to disconnect the telephone line when there is no answer from the desired communication terminal equipment unit within a predetermined time period.

Moreover, according to the present invention, when the selection signal is not inputted within a predetermined time period from the temporary answer, the telephone set connected to the interface apparatus of the invention is connected with the telephone line. By this operation the other party may achieve communication through the interface apparatus even if the function of the interface apparatus (a desired communication terminal equipment unit may be selected by a selection signal) is unknown to the other party.

Still further, according to the present invention a call from the telephone set may be given priority over the data terminal equipment units. Therefore, various kinds of communication may be effectively carried out by one telephone line without causing any problem in the original communication function.

Furthermore, the present invention makes it possible to increase the number of the communication terminal equipment units capable of being used.

The invention has been described in detail with respect to the preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An interface apparatus for use between a plurality of communication terminal equipment units and a telephone line, comprising:
    at least three first ports for connection to respective communication terminal equipment units;
    a second port connected to the telephone line;
    closing means for closing said telephone line through said second port on the basis of a signal indicating an incoming call supplied via said telephone line;
    connecting means for connecting any one of said first ports to said telephone line through said second port on the basis of a selection signal supplied via said telephone line through said second port after said telephone line has been closed by said closing means; and
    disconnecting means for automatically disconnecting said telephone line if there is no answer from a communication terminal equipment unit connected to any first port designated by the selection signal within a predetermined time period from the connection time of the communication terminal equipment unit with said telephone line.

2. An interface apparatus according to claim 1, in combination with another interface apparatus according to claim 1, said interface apparatus and said another interface apparatus being cascade-connected.

3. An interface apparatus as claimed in claim 1, wherein said disconnecting means comprises means for setting a plurality of predetermined time periods with different durations, each of said communication terminal equipment units being associated with one of the predetermined time periods.

* * * * *